Patented Jan. 5, 1937

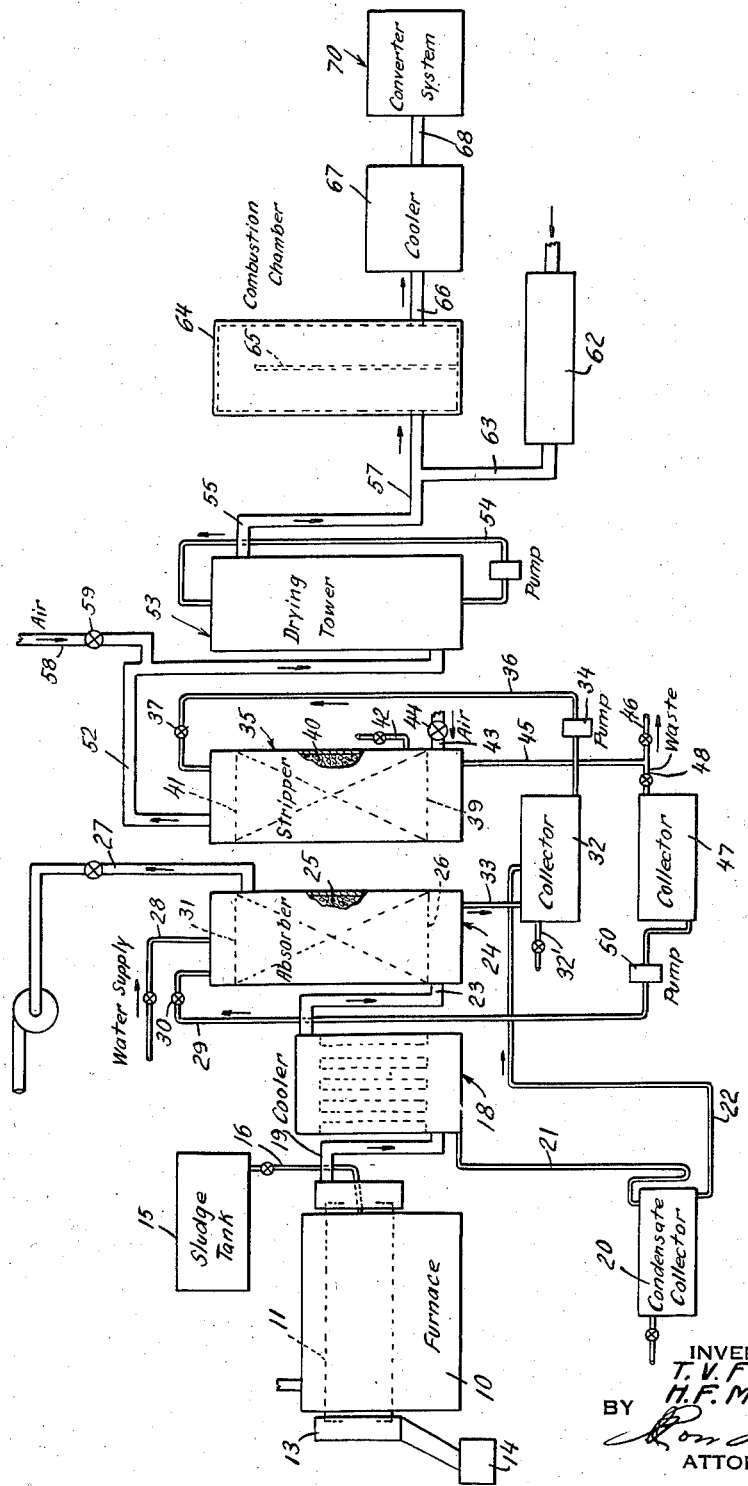

2,066,774

UNITED STATES PATENT OFFICE 2,066,774

PRODUCTION OF SULPHUR DIOXIDE

Theodore V. Fowler, Pelham, N. Y., and Henry F. Merriam, West Orange, N. J., assignors to General Chemical Company, New York, N. Y., a corporation of New York Application December 20, 1933, Serial No. 703,214

10 Claims. (Cl. 23—175)

This invention relates generally to the manufacture of sulphuric acid. More particularly, the invention is directed to a method for producing gas mixtures relatively rich in sulphur dioxide and containing sulphur dioxide and oxygen in proportions suitable for conversion to sulphur trioxide by the contact process, and employing as a source of sulphur dioxide acid sludges constituting waste products of oil refining processes in which sulphuric acid is used.

It has heretofore been suggested to decompose acid sludge to produce gas mixtures containing sulphur dioxide, and to convert the sulphur dioxide to sulphur trioxide by the contact process. Generally speaking, prior methods involve decomposition of the sludge by heating with production principally of sulphur dioxide, water and hydrocarbon vapors, cooling the gas stream to condense water and hydrocarbon vapors, adding air to form a gas mixture containing convertible proportions of sulphur dioxide and oxygen, and then catalytically oxidizing the sulphur dioxide to sulphur trioxide.

When the decomposition reaction is carried out at relatively high temperatures, for example to increase the capacity of the plant, to effect a more complete decomposition of the acid sludge, or for other reasons, the formation of hydrocarbon gases and vapors is largely increased so that, after cooling the acid sludge gas to normal temperatures to condense the water vapor and the bulk of the hydrocarbons, the exit gas of the cooler may contain, in addition to sulphur dioxide and relatively inert diluting gases such as carbon dioxide, for example 15–60% hydrocarbons by volume. The sulphur dioxide of a gas of this nature may not be economically converted to sulphur trioxide by the contact process because of the deleterious effects of the organic impurities on the catalyst employed. The hydrocarbon gases produced, as by decomposing acid sludge at comparatively high temperatures, have a high oxygen consuming power, and if converted to non-deleterious form, as by mixing with air and burning, there will result a gas mixture too lean in sulphur dioxide and oxygen to be suitable for commercial production of sulphur trioxide by the contact process.

The principal object of the present invention comprises the provision of methods by which acid sludges may be decomposed if desired at relatively high temperatures, and by which there may be formed comparatively concentrated sulphur dioxide gas mixtures of such nature as to permit conversion to sulphur trioxide by the contact process without impairing the activity of the catalyst employed, or depleting the oxygen supply in the converter system. It has been found that a relatively concentrated sulphur dioxide-oxygen gas mixture, substantially free from organic impurities and suitable for production of sulphur trioxide by the contact process, may be formed first, by contacting cool acid sludge sulphur dioxide gas with an absorbent to separate the sulphur dioxide from inert diluting gases and from the major portion of the non-condensable hydrocarbon gases of high oxygen consuming power, and second, after removing the sulphur dioxide from the absorbent as by contacting the latter with a stream of air to form an air-sulphur dioxide gas mixture, by converting to non-deleterious form the residual high oxygen consuming organic compounds, which may be contained in the air-sulphur dioxide gas mixture, as by burning the organic compounds at relatively high temperatures, preferably in the presence of a flame of burning sulphur.

According to one preferred embodiment, the process of the invention includes the decomposition of acid sludge by heating, permissibly at relatively high temperatures and desirably in the absence of substantial quantities of oxygen, to produce a gas mixture containing sulphur dioxide and water vapor, together with 10–50% by volume of hydrocarbon vapors and gaseous diluents such as carbon dioxide. The gas mixture is cooled to condense and separate the major portions of water and condensable hydrocarbons. The cooled gas mixture, which may contain substantial quantities of non-condensable hydrocarbons, is contacted with an absorbing medium adapted to selectively absorb sulphur dioxide and separate the same from the gas stream and from the larger portions of the diluting gases and gaseous impurities thereof. The absorbed sulphur dioxide is then stripped from the absorbent for example by contacting the latter with air in such quantities as to produce an air-sulphur dioxide gas mixture relatively rich in sulphur dioxide. This gas mixture may contain relatively small though appreciable amounts of non-condensable hydrocarbons which may cause discoloration of product acid and may even deleteriously affect the activity of the catalyst used in the converter system. In the more desirable forms of the invention, this gas stream is introduced preferably after drying, into a combustion chamber, in which sulphur vapor is burned to sulphur dioxide. Because of the high temperatures in the combustion chamber and apparently on account of the presence of the flame of burning sulphur, the hydrocarbon impurities are converted to non-deleterious form. The combustion chamber exit gas, containing oxygen and the sulphur dioxide produced by decomposing the acid sludge and by burning the sulphur vapor, is then cooled to optimum initial converting temperature, and the sulphur dioxide is oxidized to sulphur trioxide by means of a suitable catalyst.

A further appreciation of the objects and advantages of the invention may be had from a consideration of the following detailed description taken in connection with the accompanying drawing which illustrates diagrammatically one form of apparatus for carrying out a preferred embodiment of the process of the invention.

Referring to the drawing, the reference numeral 10 indicates the combustion chamber of a furnace adapted to burn coal, coke, oil, natural gas or other fuel. Mounted in the combustion chamber 10 is a decomposing kiln or retort 11 of any known construction and provided with suitable mechanism, such as a screw conveyor not shown, to facilitate discharge of coke therefrom. The specific construction of the furnace constitutes no part of the present invention except that one preferred embodiment of the process contemplates the use of an externally heated kiln constructed so as to substantially exclude air therefrom.

One end of the kiln 11 is provided with a gas outlet 19. The opposite end of the kiln projects into a header 13 into which the solid residue of the decomposition of the acid sludge is continuously discharged. Header 13 is provided with an air-lock 14 through which coke may be withdrawn without admitting air to the kiln. Acid sludge is run into the kiln from a supply tank 15 through a valve-controlled pipe 16, the lower end of which projects into the end of the kiln.

The gas outlet conduit 19 is connected to the lower end of a cooler or condenser 18. The condenser may be of any suitable construction, either air or water cooled, and controlled so as to reduce the temperature of gas passing therethrough to substantially normal to thereby effect condensation of the bulk of the water vapor and a large proportion of the condensable hydrocarbons contained in the gas. The condensate from the cooler is drained into a collector 20 through a pipe connection 21 having a liquid seal therein. The gases uncondensed in the cooler pass through conduit 23 and are charged into the lower end of an absorber indicated generally by the reference numeral 24.

A horizontal perforated plate 26, in the lower end of the absorber 24, supports a body of packing material 25, for example quartz pebbles, coke, etc., the upper surface of which lies slightly below the inlet end of an exit gas offtake 27. Absorbing liquid, such as water, is introduced into the upper end of the absorber through a valve-controlled inlet pipe 28, or through an inlet pipe 29 having therein a valve 30. The liquid fed into the absorber flows over a perforated plate 31 by means of which the liquid is distributed evenly over the upper surface of the packing 25. The absorbing liquid runs downwardly over the packing and intimately contacts the upwardly flowing gas stream. The liquid and the absorbed gases therein run out of the lower end of the absorber and are drained into a collector 32 through the pipe connection 33. Collector 32 is provided with a valved tap 32', through which any oils rising to the surface of the absorbing liquid in collector 32 may be conveniently drawn off.

The liquid from the collector 32, containing absorbed gases, is fed by a pump 34 into the upper end of a stripping tower 35 through pipe 36 provided with a control valve 37. The construction of the stripper 35 is substantially the same as that of the absorber 25, and includes a perforated plate 39 near the lower end of the tower for supporting packing material 40. The liquid introduced into the stripper through pipe 36 is flowed over the upper surface of the packing 40 by a distributing plate 41. Steam may be admitted to the stripper at a point between the top and bottom through valve-controlled inlet 42. An air inlet connection 43, having a control valve 44, opens into the stripping chamber beneath perforated plate 39. The stripped absorbing liquid flows out of the stripping tower through a pipe connection 45 and may be run to waste through outlet 46 or into tank 47 through pipe 48. Where the stripped absorbing medium is recirculated through the system, it is fed back into the absorber 24 from tank 47 through pipe 29 by pump 50. Water from collector 20 may, if desired, be run into collector 32 through line 22. If desired, bubble towers may be used in place of the absorber and stripper described.

The gases leaving the upper end of the stripper are conducted through a conduit 52 into the lower end of drying tower 53 which may be of any suitable construction such as employed in the manufacture of sulphuric acid. The reference numeral 54 indicates generally apparatus for circulating drying acid through the drying tower. Dried gases are withdrawn from the upper end of the drying tower through a conduit 55 and discharged into gas line 57. Provision is made for introducing diluting air into the gas stream between the stripper and drying tower by means of an inlet pipe 58 connected to the conduit 52 and having a control valve 59 therein.

Reference numeral 62 indicates a sulphur burner or sublimer, the outlet side of which communicates through pipe 63 with the gas line 57. The latter opens into the bottom of a combustion chamber 64 which may be provided with a vertical partition 65. The exit gases of the combustion chamber are passed through a cooler 67, and thence through pipe 68 to the converter system indicated at 70.

One preferred embodiment of the invention may be carried out substantially as follows:

Acid sludges resulting from the refining of oils vary widely in composition, one representative sludge containing sulphuric acid, free and in combination, equivalent to 45% $H_2SO_4$, 20% water and 35% oils and tarry hydrocarbons. The process of the invention is directed to the treatment of sulphur dioxide produced from acid sludges of such nature, representing the residual sludge obtained in the refining of oils and waxes with sulphuric acid, and also to the treatment of sulphur dioxide produced by decomposition of the sludge acids representing the impure sulphuric acid obtained by partial or complete hydrolysis of the original acid sludge, and from which the major portion of the organic material has been removed in the process of hydrolysis. In the appended claims, the term acid sludge is intended to include sludge acids.

Acid sludge is continuously fed into the kiln from supply tank 15 through the pipe connection 16. For reasons hereafter explained, the process of the present invention is particularly adaptable for purification of acid sludge gases which, because of the nature of the acid sludge or on account of the method of decomposition, may contain relatively large amounts of hydrocarbon gases which are not condensable at ordinary temperatures. When the temperatures at which decomposition is effected are relatively high, for example to increase the plant capacity, the formation of organic vapors and gases is largely increased. However, since the purification process of the invention is especially suited to handle gases high in non-condensable hydrocarbons, the decomposition of the acid sludge in kiln 11 may be carried out at relatively high temperatures. Consequently, the burners in furnace 10 may be so adjusted as to maintain within the kiln 11 relatively high decomposition temperatures, for example 550–850° F. and substantially higher if desired.

The sludge is decomposed in the kiln by the action of the heat, and the free and combined sulphuric acid of the sludge is reduced to sulphur dioxide by the hydrogen of the hydrocarbons and/or by the carbonaceous matter contained in the sludge. The rate of rotation of the screw conveyor and the quantity of sludge fed into the kiln are so adjusted that substantially all of the sulphuric acid is reduced during the passage of the sludge through the kiln, and sulphur dioxide is formed. Coke is continuously discharged from the kiln into the drum 13.

The gas resulting from the decomposition of the sludge in the kiln contains principally sulphur dioxide and water vapor, hydrocarbon gases and vapors, and smaller quantities of relatively inert diluting gases such as carbon dioxide, carbon monoxide, nitrogen and oxygen. As previously noted, according to one preferred embodiment of the process, the decomposition of the sludge is effected in the kiln substantially in the absence of air. Hence, burning of carbonaceous matter of the sludge and dilution of the gas evolved is prevented to a large degree. The sulphur dioxide gas mixture leaving the kiln may contain, for example, as high as 15% by volume sulphur dioxide.

The hot gaseous products of the decomposition of the sludge are withdrawn from the kiln and conducted through conduit 19 into the condenser 18 in which the gases are cooled to substantially normal temperatures. During such cooling, substantially all of the water vapor and the major portion of the hydrocarbons are condensed out of the gas stream. The condensate of cooler 18, containing varying proportions of water and liquid hydrocarbons, is drained into the collector 20, in which water and oil may be separated by decantation or otherwise. If the water from collector 20 contains appreciable quantities of sulphur dioxide, the water may be run through line 22 into collector 32, and the sulphur dioxide recovered as hereinafter noted.

On account of the separation of water and hydrocarbons from the gas stream, the sulphur dioxide concentration of the latter is increased, and the sulphur dioxide content of the gases passing through conduit 23 into the absorber 24 may vary from less than 50 to as high as 92% depending largely upon the nature of the acid sludge and particularly upon the temperature at which the acid sludge is decomposed. As above noted, when the temperature of decomposition of the acid sludge in retort 11 is relatively high, for example 550–850° F. to increase plant capacity or to more completely decompose the acid sludge, large quantities of organic vapors and gases are formed, and the cooled gas stream in line 23 may contain as high as say 60% by volume of such gases and vapors. These hydrocarbons have a particularly high oxygen consuming power. On a basis of 100 volumes, one such gas was found to contain about 50% sulphur dioxide, 4% carbon dioxide, 2% carbon monoxide, and hydrocarbon gases and/or vapors which, if burned to carbon dioxide, would consume about 300 volumes of oxygen (about 1500 volumes of air). Consequently, it will be seen that these hydrocarbons are not merely inert diluents, but are extremely detrimental to the subsequent utilization of the sulphur dioxide in the production of sulphur trioxide because of this high oxygen consuming power. For example, if it were desired to convert the hydrocarbons of the above gas to non-deleterious form, as by burning in air, it would be necessary, to provide the requisite quantity of oxygen for combustion of the hydrocarbons and subsequent oxidation of sulphur dioxide to sulphur trioxide, to introduce into the gas stream so much air that the resulting gas, as charged into the converter system, would contain but little sulphur dioxide say around 3%. By the present invention, these detrimental hydrocarbons may be substantially completely removed from the gas stream, and a relatively concentrated sulphur dioxide gas mixture produced, particularly suited for conversion to sulphur trioxide by the contact process.

In the absorber, the gases are intimately contacted with absorbing liquid, such as water or weak acid, flowing downwardly over the packing. The absorbing liquid is introduced into the absorber through inlet pipes 28 or 29 at substantially normal temperature, and the quantity of such liquid is so regulated as to provide for the substantially complete absorption of sulphur dioxide from the gas stream. The absorption operation thus effects removal of the sulphur dioxide from the gas stream, and the separation of the sulphur dioxide from diluting gases such as carbon dioxide, etc., and from the major portion of the uncondensed hydrocarbons and other gaseous impurities which consume oxygen in the converter system and which may deleteriously affect the activity of the catalysts, particularly platinum. Unabsorbed gases and/or vapors leave the absorber through pipe 27. In the above example, as the gas entering the absorber through pipe 23 contained in excess of 40% by volume of hydrocarbons, it will be apparent the gas mixture in line 27 has a high hydrocarbon content, and hence may be economically utilized as fuel in the furnace 10.

The absorbing liquid, containing for example around 6% sulphur dioxide and possibly some small quantity of condensed hydrocarbons, runs out of the bottom of the absorber and into the collector 32. Any liquid hydrocarbons in the absorbing liquid rise to the surface thereof, and may be tapped off through outlet 32', thus avoiding possible contamination, by organic matter, of the gas stream leaving the stripper 35. The liquid is then pumped through pipe 36 into the upper end of the stripping tower 35. The water or weak acid, containing the absorbed sulphur dioxide, runs downwardly over packing 40 and is intimately contacted with an upwardly flowing stream of air or oxygen containing gas introduced into the system through the inlet 43 near the lower end of the stripping tower.

The quantity of air charged into the stripper through the inlet 43 may, in some instances be so regulated by adjustment of valve 44 that the sulphur dioxide concentration of the sulphur dioxide-air gas mixture leaving the upper end of the stripper through the outlet pipe 52 may be as high as 60%. If desired, steam may be fed into the stripper through inlet 42 to more effectively separate sulphur dioxide and provide a strong substantially 100% sulphur dioxide gas in outlet 52. A strong gas of this kind may also be obtained by externally heating the stripper to thus produce a substantially 100% sulphur dioxide gas. Procedures of this nature may be followed where it is desired to obtain for any purpose a gas mixture having a sulphur dioxide concentration higher than would ordinarily be employed in the manufacture of sulphur trioxide by the contact process or where it is desired to produce a substantially 100% sulphur dioxide gas.

In the operation of the preferred embodiment of the process, valve 44 is adjusted to permit admission to the stripper of a greater quantity of air than that actually required to effect reasonably complete separation of sulphur dioxide from the absorbing liquid, but at the same time, the quantity of air thus admitted to the stripper is so limited as to provide in the conduit 52 a mixture of sulphur dioxide and air having a sulphur dioxide concentration of say 20% or higher, for example, the gas may comprise about 20% sulphur dioxide, 16% oxygen and 63% nitrogen. Hence, the stripping operation is carried out in such manner that not only is an effective separation of the absorbed sulphur dioxide from the absorbing liquid obtained, but the composition of the exit gas of the stripper is at the same time so controlled as to provide a relatively concentrated sulphur dioxide gas mixture which may contain relatively small amounts of hydrocarbon gases.

The absorbing liquid running out of the stripper through the pipe 45 generally contains substantially no sulphur dioxide and may, where water is employed, be turned to waste through outlet 46 However, in some instances, if it is desired to retain in the system such quantities of sulphur dioxide or other compounds as the stripped absorbing medium may contain, or if absorbent supply is limited, the liquid is collected in tank 47 and reintroduced into the absorber 24 by the pump 50 through pipe 29. Although the invention contemplates normal temperatures both in the absorber and in the stripper, it will be understood that still more efficient absorption of sulphur dioxide may be obtained by cooling the absorbing liquid prior to the introduction thereof into the absorber, and that a more efficient extraction of the sulphur dioxide from the absorbing liquid may be obtained in the stripper by conducting the stripping operation at elevated temperatures for example by heating the liquid prior to its introduction into the stripper, by heating the air charged in through inlet pipe 43, or by admitting steam through pipe 42. In case stripping is carried out at elevated temperatures, it will be understood the effluent liquid of the stripper may be cooled before return to the absorber.

The strong sulphur dioxide exit gas of the stripper is conducted into the lower end of the drying tower 53 through conduit 52. Suitable quantities of drying acid are passed through tower 53 by the circulating system 54, and the gas mixture, thus dried in known manner, is discharged from the drying tower through conduit 55 into gas line 57.

Sulphur burner 62 may be of any desirable type or construction such as the well known Glens Falls burner In operation of the latter, brimstone and preferably dried air are fed into the inlet end of the burner in the usual way. The gas mixture produced and discharged into conduit 63 may contain for example about 18% sulphur dioxide and about 14% sulphur vapor by volume calculated as $S_8$, the remaining being nitrogen This mixture of hot sulphur dioxide and sulphur vapor is introduced into gas line 57 and becomes admixed therein with the sulphur dioxide gas from the drying tower 53, the combined mixture being charged into the lower end of combustion chamber 64.

When so operating, additional quantities of air are desirably drawn into the apparatus and utilized for burning in the combustion chamber the sulphur vapor produced by the burner together with the relatively small quantity of hydrocarbon gases and/or vapors contained in the exit gas of the drying tower. To supply this quantity of air, valve 59 of inlet pipe 58 is preferably adjusted to admit into the system enough air so that the gas mixture entering the combustion chamber from gas line 57 contains a sufficient excess of air to permit oxidation of the sulphur vapor and the hydrocarbons introduced into the combustion chamber. Generally, this amount of air insures oxidation of sulphur vapor and organic matter and is such that the temperature of the gas in the combustion chamber prior to discharge through line 66 is preferably not less than 1200–1250° F. Depending upon the particular operating conditons, valve 59 may be adjusted accordingly, the only precaution being to admit air enough into the system to raise the temperature of the gas mixture in the combustion chamber to not less than about 1000° F., and preferably about 1200–1250° F., after allowing for radiation loss.

In the combustion chamber, the sulphur vapor is burned to sulphur dioxide, and the hydrocarbons contained in the exit gas of the drying tower are converted to a form not harmful to the catalysts employed in the converter system nor discolor acid produced. In the combustion chamber the sulphur burns with the flame, and the high temperature developed in conjunction with the presence of the flame effects conversion of organic matter to non-harmful form. This procedure involving the oxidation of organic matter in the presence of a sulphur flame in the combustion chamber is of particular importance, since it appears that the conditions caused by the presence of the sulphur flame in the combustion chamber are highly desirable in bringing about conversion of the organic matter to non-harmful form.

As noted above, the hydrocarbons contained in the exit gas of the drying tower are of such nature as to consume relatively large quantities of oxygen during oxidation. However, since the amount of hydrocarbon gases in the exit gas of the drying tower is comparatively small, these hydrocarbons may be disposed of without admitting to the system such quantities of air as to dilute the exit gas of the combustion chamber to below commercial concentrations. When proceeding as described, the exit gas of the combustion chamber may be at temperatures generally in the neighborhood of 1200° F., and may contain say 12–14% $SO_2$ and about 12–13% oxygen.

The amount of brimstone burned in burner 62 and in combustion chamber 64 is dependent largely upon the concentration of sulphur dioxide in the gas at the exit of the drying tower. In the particular example, it is desirable to regulate the operation of burner 62 so that of the total sulphur dioxide contained in the exit gas of the combustion chamber approximately 25% is produced by burning brimstone, the remaining 75% being obtained from decompositon of the acid sludge.

Other suitable apparatus may be utilized in place of burner 62, for example a sulphur sublimer such as disclosed in Gillett U. S. Patent 1,832,013, November 17, 1931, may be employed. In the operation of a sublimer of this type, the exit gas mixture may contain in the neighborhood of 17% sulphur dioxide and 19% sulphur vapor calculated as $S_8$. Whatever type of apparatus may be employed to generate sulphur vapor, it will be understood that the operation thereof is so controlled as to introduce into the combustion chamber sulphur vapor in quantities such that, when burned, the temperatures in the combustion chamber are not less than as above indicated.

The hot exit gases of the combustion chamber are conducted through any suitable type of heat exchanger 67, and are cooled to optimum initial conversion temperature, for example around 750° F. The cooler exit gases are then passed through line 68 into the converter system 70, and oxidation of sulphur dioxide to sulphur trioxide is effected in the usual way by means of suitable catalysts such as vanadium or platinum.

Instead of treating the exit gases of the stripper 35 in apparatus such as described above, the stripper exit gas may be turned directly into a combustion chamber, such as combustion chamber 64, into which may be introduced the exit gases of a sulphur burner, such as burner 62. In this instance, the operation of the burner 62 may be so controlled as to provide in the combustion chamber the requisite amount of hot sulphur dioxide and unburned sulphur to raise the temperature of the gas stream in the combustion chamber to not less than the temperatures already noted. When so proceeding, it will be understood that sufficient amounts of air, which may be undried, may be introduced into the combustion chamber to effect oxidation of the unburned sulphur and of the hydrocarbons contained in the stripper gas. The exit gases of the combustion chamber may then be purified and dried in a wet purification system, such as usually employed in the manufacture of sulphuric acid, and then reheated to initial conversion temperature. However, it is preferred to carry out the process in the manner described in connection with the apparatus disclosed in the drawing.

According to one modification of the invention, the decomposition of the acid sludge may be carried out in a kiln by heating the sludge in the presence of hot combustion gases. When so operating, the gases resulting from the decomposition of the sludge are, broadly speaking, of the same general composition as the gases obtained when conducting the process in accordance with the preferred embodiment of the invention except that the sulphur dioxide content of the exit gas of the kiln may be lower because of dilution by the combustion gases. It will be understood, of course, that the composition of the exit gases of the decomposing kiln depends also on the nature of the sludge employed.

Generally considered, the operation of the modified form of the process, is substantially the same as already described in connection with the preferred embodiment, except that the quantity of air admitted to the stripper through the inlet 43 is adjusted in accordance with the sulphur dioxide content of the gases produced by the decomposition of the sludge. For example, where the gases entering the absorber through the pipe connection 23 contain less than say 20-25% sulphur dioxide, the valve 44 is adjusted so as to admit to the stripper the minimum amount of air necessary to effect separation of the sulphur dioxide from the absorbing liquid, to thus obtain the maximum sulphur dioxide concentration of the exit gas of the stripper. In this instance, the sulphur dioxide content of the exit gas of the stripper would probably be a few percent less than that of the gas entering the absorber.

Instead of absorbing the sulphur dioxide in a liquid such as water or weak acid, solid adsorbents such as silica gel may be employed for separating the sulphur dioxide from gaseous impurities. When solid adsorbents are utilized, the sulphur dioxide may be released therefrom in any suitable manner, for example by heating or by stripping by means of hot air.

The main advantages of the invention, however, relate to the recovery of sulphur compounds from sludge, and the subsequent utilization of such compounds in the manufacture of sulphuric acid by the contact process. Because of the preferred method of carrying out the decomposition of the sludge by heating in the substantial absence of oxygen, the sulphur dioxide content of the exit gas of the decomposing kiln is high and is considerably in excess of the sulphur dioxide content of the gases obtained by roasting sulphide ores or burning brimstone. Because of the gas purification method, involving absorption of sulphur dioxide, separation of sulphur dioxide from the absorbent and oxidizing the residual organic compounds in the presence of a flame of burning sulphur, relatively high temperatures may be employed in the acid sludge decomposing unit, the hydrocarbon gases of high fuel value discharged from the absorber may be recovered and utilized, and of particular importance, deleterious organic impurities are effectively eliminated from the system. Since deleterious gaseous impurities are thus removed, conversion of the sulphur dioxide to sulphur trioxide may be effected by the use of platinum or other easily poisoned catalysts, and depletion of oxygen by combustion of the organic compounds is avoided.

We claim:

1. The method of producing sulphur trioxide which comprises heating acid sludge derived from treatment of hydrocarbon oils with sulphuric acid to a temperature sufficient to decompose the sludge to form a hot gas mixture containing sulphur dioxide, diluting gases and organic matter comprising hydrocarbon gases and/or vapors partly condensable and partly non-condensable at about ordinary temperatures, cooling the gas mixture to separate condensable vapors therefrom, contacting the cooled gas mixture with an absorbent liquid adapted to absorb sulphur dioxide and separate the same from diluting gases and the major portion of said organic matter, stripping the sulphur dioxide from the absorbent liquid by contacting an oxygen containing gas therewith, whereby a sulphur dioxide-oxygen gas mixture containing residual organic matter is obtained, introducing sulphur into the gas mixture, burning the sulphur whereby residual organic matter is converted to non-deleterious form, and catalytically oxidizing the sulphur dioxide to sulphur trioxide.

2. The method of producing sulphur trioxide which comprises heating acid sludge derived from treatment of hydrocarbon oils with sulphuric acid to a temperature sufficient to decompose the sludge to form a hot gas mixture containing sulphur dioxide, diluting gases and organic matter comprising hydrocarbon gases and/or vapors partly condensable and partly non-condensable at about ordinary temperatures, cooling the gas mixture to separate condensable vapors therefrom, contacting the cooled gas mixture with an absorbent adapted to absorb sulphur dioxide and separate the same from diluting gases and the major portion of said organic matter, stripping the sulphur dioxide from the absorbent by contacting an oxygen containing gas therewith, whereby a sulphur dioxide-oxygen gas mixture containing residual organic matter is obtained, introducing sulphur into the gas mixture, burning the sulphur whereby residual organic matter is converted to non-deleterious form, and catalytically oxidizing the sulphur dioxide to sulphur trioxide.

3. The method of producing sulphur trioxide which comprises heating acid sludge derived from treatment of hydrocarbon oils with sulphuric acid to a temperature sufficient to decompose the sludge to form a hot gas mixture containing sulphur dioxide, diluting gases and organic matter comprising hydrocarbon gases and/or vapors partly condensable and partly non-condensable at about ordinary temperatures, cooling the hot gas mixture to separate condensable vapors therefrom, contacting the gas mixture with an absorbent adapted to absorb sulphur dioxide and separate the same from diluting gases and the major portion of said organic matter, stripping the sulphur dioxide from the absorbent and forming a sulphur dioxide-oxygen gas mixture containing residual organic matter, introducing sulphur into the gas mixture, burning the sulphur whereby residual organic matter is converted to non-deleterious form, and catalytically oxidizing the sulphur dioxide to sulphur trioxide.

4. The method of producing sulphur trioxide which comprises heating acid sludge derived from treatment of hydrocarbon oils with sulphuric acid to a temperature sufficient to decompose the sludge to form a hot gas mixture containing sulphur dioxide, diluting gases and organic matter comprising hydrocarbon gases and/or vapors partly condensable and partly non-condensable at about ordinary temperatures, cooling the hot gas mixture to separate condensable vapors therefrom contacting the gas mixture with an absorbent adapted to absorb sulphur dioxide and separate the same from diluting gases and the major portion of said organic matter, stripping the sulphur dioxide from the absorbent and forming a sulphur dioxide-oxygen gas mixture containing residual organic matter, raising the temperature of the gas mixture to not less than about 1000° F. in the presence of sufficient oxygen to oxidize the residual organic matter, and catalytically oxidizing the sulphur dioxide to sulphur trioxide.

5. The method of producing sulphur trioxide which comprises heating acid sludge derived from treatment of hydrocarbon oils with sulphuric acid to a temperature sufficient to decompose the sludge to form a hot gas mixture containing sulphur dioxide, diluting gases and organic matter comprising hydrocarbon gases and/or vapors partly condensable and partly non-condensable at about ordinary temperatures, cooling the gas mixture to separate condensable vapors therefrom and increase the sulphur dioxide concentration, contacting the cooled gas mixture with an absorbent liquid adapted to absorb the sulphur dioxide and separate the same from diluting gases and the major portion of said organic matter, stripping the sulphur dioxide from the absorbent liquid by contacting air therewith in such quantities as to produce a gas mixture containing residual organic matter and having a sulphur dioxide concentration substantially in excess of that of the gas resulting from the decomposition of the sludge and containing oxygen in excess of convertible proportions of sulphur dioxide and oxygen, introducing sulphur vapor into the gas mixture, burning the sulphur under conditions to create a sulphur flame and raise the temperature of the gas mixture to not less than about 1000° F. whereby residual organic matter is converted to non-deleterious form, cooling the gas mixture, and catalytically oxidizing the sulphur dioxide to sulphur trioxide.

6. The method of producing a sulphur dioxide gas mixture substantially free from hydrocarbons which comprises heating acid sludge derived from treatment of hydrocarbon oils with sulphuric acid to a temperature sufficient to decompose the sludge to form a hot gas mixture containing sulphur dioxide, diluting gases and hydrocarbon gases and/or vapors, cooling the hot gas mixture to separate condensable vapors therefrom, contacting the gas mixture with an absorbent adapted to absorb sulphur dioxide and separate the same from diluting gases and the major portion of said hydrocarbons, stripping the sulphur dioxide from the absorbent and forming a sulphur dioxide gas mixture containing residual hydrocarbons, and burning sulphur in the gas mixture in the presence of sufficient oxygen to oxidize the residual hydrocarbons.

7. The method of producing a sulphur dioxide gas mixture substantially free from hydrocarbons which comprises heating acid sludge derived from treatment of hydrocarbon oils with sulphuric acid to a temperature sufficient to decompose the sludge to form a hot gas mixture containing sulphur dioxide, diluting gases and hydrocarbon gases and/or vapors, cooling the hot gas mixture to separate condensable vapors therefrom, contacting the gas mixture with an absorbent liquid adapted to absorb sulphur dioxide and separate the same from diluting gases and the major portion of said hydrocarbons, stripping the sulphur dioxide from the absorbent liquid and forming a sulphur dioxide gas mixture containing residual hydrocarbons, and, in the presence of sufficient oxygen to oxidize the residual hydrocarbons, raising the temperature of the gas mixture to not less than about 1000° F.

8. The method of producing a sulphur dioxide gas mixture substantially free from hydrocarbons which comprises heating acid sludge derived from treatment of hydrocarbon oils with sulphuric acid to a temperature sufficient to decompose the sludge to form a hot gas mixture containing sulphur dioxide, diluting gases and hydrocarbon gases and/or vapors, cooling the gas mixture to separate condensable vapors therefrom, contacting the cooled gas mixture with an absorbent adapted to absorb sulphur dioxide and separate the same from diluting gases and the major portion of said hydrocarbons, stripping the sulphur dioxide from the absorbent and forming a sulphur dioxide gas mixture containing residual hydrocarbons, and, in the presence of sufficient oxygen to oxidize the residual hydrocarbons, raising the temperature of the gas mixture to not less than about 1000° F.

9. The method of producing a sulphur dioxide-oxygen gas mixture substantially free from hydrocarbons which comprises heating acid sludge derived from treatment of hydrocarbon oils with sulphuric acid to a temperature sufficient to decompose the sludge to form a hot gas mixture containing sulphur dioxide, diluting gases and hydrocarbon gases and/or vapors, cooling the gas mixture to separate condensable vapors therefrom, contacting the cooled gas mixture with an absorbent liquid adapted to absorb sulphur dioxide and separate the same from diluting gases and the major portion of said hydrocarbons, stripping the sulphur dioxide from the absorbent liquid by contacting an oxygen containing gas therewith, whereby a sulphur dioxide-oxygen gas mixture containing residual hydrocarbons is obtained, introducing sulphur into the gas mixture, and burning the sulphur in the gas mixture in the presence of sufficient oxygen to oxidize the residual hydrocarbons 10. The method of producing a gas mixture rich in sulphur dioxide and substantially free from hydrocarbons which comprises heating acid sludge derived from treatment of hydrocarbon oils with sulphuric acid to a temperature sufficient to decompose the sludge to form a hot gas mixture containing sulphur dioxide, diluting gases and hydrocarbon gases and/or vapors, cooling the gas mixture to separate condensable vapors therefrom and increase the sulphur dioxide concentration, contacting the gas mixture with an absorbent liquid adapted to absorb the sulphur dioxide and separate the same from diluting gases and the major portion of the hydrocarbons, stripping the sulphur dioxide from the absorbent by contacting air therewith in such quantities as to produce a gas mixture containing residual hydrocarbons and having a sulphur dioxide concentration substantially in excess of that of the gas resulting from the decomposition of the sludge and, in the presence of sufficient oxygen, to oxidize the residual hydrocarbons, burning sulphur in the gas mixture to raise the temperature thereof to not less than about 1000° F. to thereby substantially eliminate residual hydrocarbons from the gas mixture.

THEODORE V. FOWLER.
HENRY F. MERRIAM.